(12) United States Patent
Schroeder

(10) Patent No.: US 8,132,330 B2
(45) Date of Patent: Mar. 13, 2012

(54) BEARING ASSEMBLY AND METHOD OF MAKING A BEARING ASSEMBLY

(75) Inventor: Jonathan R. Schroeder, Roscoe, IL (US)

(73) Assignee: Pacific Bearing Company, Rockford, IL (US)

( * ) Notice: Subject to any disclaimer, the term of this patent is extended or adjusted under 35 U.S.C. 154(b) by 976 days.

(21) Appl. No.: 11/943,890

(22) Filed: Nov. 21, 2007

(65) Prior Publication Data

US 2009/0080816 A1  Mar. 26, 2009

Related U.S. Application Data

(60) Provisional application No. 60/974,343, filed on Sep. 21, 2007.

(51) Int. Cl.
*B21D 53/10* (2006.01)
*F16C 19/00* (2006.01)

(52) U.S. Cl. ............... 29/898.03; 29/898.13; 29/898.14; 29/445; 29/505; 29/513; 29/514; 384/55

(58) Field of Classification Search ............... 29/898.03, 29/898.12, 898.13, 898.14, 402.09, 402.14, 29/402.18, 402.19, 437, 439, 440, 445, 505, 29/513, 514; 384/55–59
See application file for complete search history.

(56) References Cited

U.S. PATENT DOCUMENTS

| | | | |
|---|---|---|---|
| 3,748,212 A * | 7/1973 | Piampiano et al. ............. 428/58 |
| 4,025,995 A | 5/1977 | Thomson |
| 4,635,331 A | 1/1987 | Walter et al. |
| 4,644,702 A * | 2/1987 | Teramachi ........................ 451/52 |
| 4,682,899 A | 7/1987 | Andersson et al. |
| 5,067,823 A * | 11/1991 | Kasuga ............................ 384/45 |
| 5,211,279 A | 5/1993 | Abbestam et al. |
| 5,211,483 A * | 5/1993 | Blaurock ........................ 384/56 |
| 5,217,308 A | 6/1993 | Schroeder |
| 5,431,498 A | 7/1995 | Lyon |
| 5,800,065 A | 9/1998 | Lyon |
| 5,806,986 A | 9/1998 | Barth et al. |
| 5,930,898 A | 8/1999 | Lyon |
| 6,346,788 B1 * | 2/2002 | Nagai et al. ................... 318/432 |
| 7,300,208 B2 | 11/2007 | Kuellstaedt et al. |
| 2002/0164095 A1 | 11/2002 | Nagai et al. |
| 2004/0216543 A1 | 11/2004 | Nagai et al. |

FOREIGN PATENT DOCUMENTS

EP  0 577 995 A2  1/1994

(Continued)

OTHER PUBLICATIONS

SKF Motion Technologies, Product Datasheet Name: Speedi-Roll Designation: LLEHS 15 Speedi-Roll product datasheet from website www.linearmotion.skf.com, 2 pages.

(Continued)

*Primary Examiner* — Sarang Afzali
(74) *Attorney, Agent, or Firm* — Reinhart Boerner Van Deuren P.C.

(57) ABSTRACT

A method of making a bearing assembly and a bearing assembly is provided. The method includes the steps of extruding a support rail, providing a mounting surface on the support rail, mounting a bearing rail on the mounting surface and machining a bearing surface on the bearing rail. The bearing assembly includes an extruded support rail and a bearing rail. The bearing rail is of a harder material than the material of the support rail to which the bearing rail is mounted. The bearing rail further provides a machine polished linear contact.

10 Claims, 12 Drawing Sheets

FOREIGN PATENT DOCUMENTS

FR 2 537 896 A1 6/1984
JP 08004764 1/1996

OTHER PUBLICATIONS

SKF Motion Technologies, Product Datasheet Name: Speedi-Roll Designation: LLEHS 15 L Speedi-Roll product datasheet from website www.linearmotion.skf.com, 2 pages.

SKF Motion Technologies, Product Datasheet Name: Speedi-Roll Designation: LLEHS 25 Speedi-Roll product datasheet from website www.linearmotion.skf.com, 2 pages.

SKF Motion Technologies, Product Datasheet Name: Speedi-Roll Designation: LLEHS 25 L Speedi-Roll product datasheet from website www.linearmotion.skf.com, 2 pages.

SKF Motion Technologies, Product Datasheet Name: Speedi-Roll Designation: LLEHS 35 Speedi-Roll product datasheet from website www.linearmotion.skf.com, 2 pages.

\* cited by examiner

BEARING ASSEMBLY AND METHOD OF MAKING A BEARING ASSEMBLY

CROSS-REFERENCE TO RELATED PATENT APPLICATIONS

This patent application claims the benefit of U.S. Provisional Patent Application No. 60/974,343, filed Sep. 21, 2007, the disclosure and teachings of which are incorporated herein in their entireties, by reference.

FIELD OF THE INVENTION

This invention generally relates to linear bearing assemblies and more particular to bearing assemblies and method of making bearing assemblies having a bearing rail attached to a support rail.

BACKGROUND OF THE INVENTION

Bearing assemblies, and particularly linear bearing assemblies are well known in the art as is exemplified by U.S. Pat. No. 5,211,279 assigned to SKF Specialty Products AB (herein the '279 patent). Conventionally, bearing assemblies of this type employed hardened bearing rails that were inserted into grooves of the support rails. The support rails were conventionally extruded and the grooves that form the mounting surfaces upon which the bearing rails were mounted were formed during the extrusion process. As such, significant tolerance variations in the surface of the bearing rails could occur. To accommodate the low tolerance levels and variations the bearing rails, the '279 patent teaches a carriage that includes guide wheels or rollers that are adjustable relative to the body of the carriage. This adjustability was used to take up the variation in the bearing surfaces of the bearing rails. Improvements over the state of the art are disclosed herein.

BRIEF SUMMARY OF THE INVENTION

A first aspect of the invention is directed to a method of making a bearing assembly that provides improved tolerance levels for the bearing surfaces upon which a guide assembly such as ball bearings or guide rollers can ride without requiring these assemblies to be adjustable to compensate for variations in the bearing surfaces. According to this inventive method, a support rail is extruded. A mounting surface is provided on the support rail for mounting a bearing rail. The bearing rail is then mounted on the mounting surface. A bearing surface of the bearing rail is then machined to reduce the tolerance variation of the bearing surface.

In another aspect, the invention is directed to a bearing assembly that includes a support rail and a bearing rail. The support rail is preferably formed from extruded aluminum. The bearing rail is mounted to the support rail and is formed from a harder material than the support rail. The bearing assembly includes a machine polished linear contact formed along the support rail.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
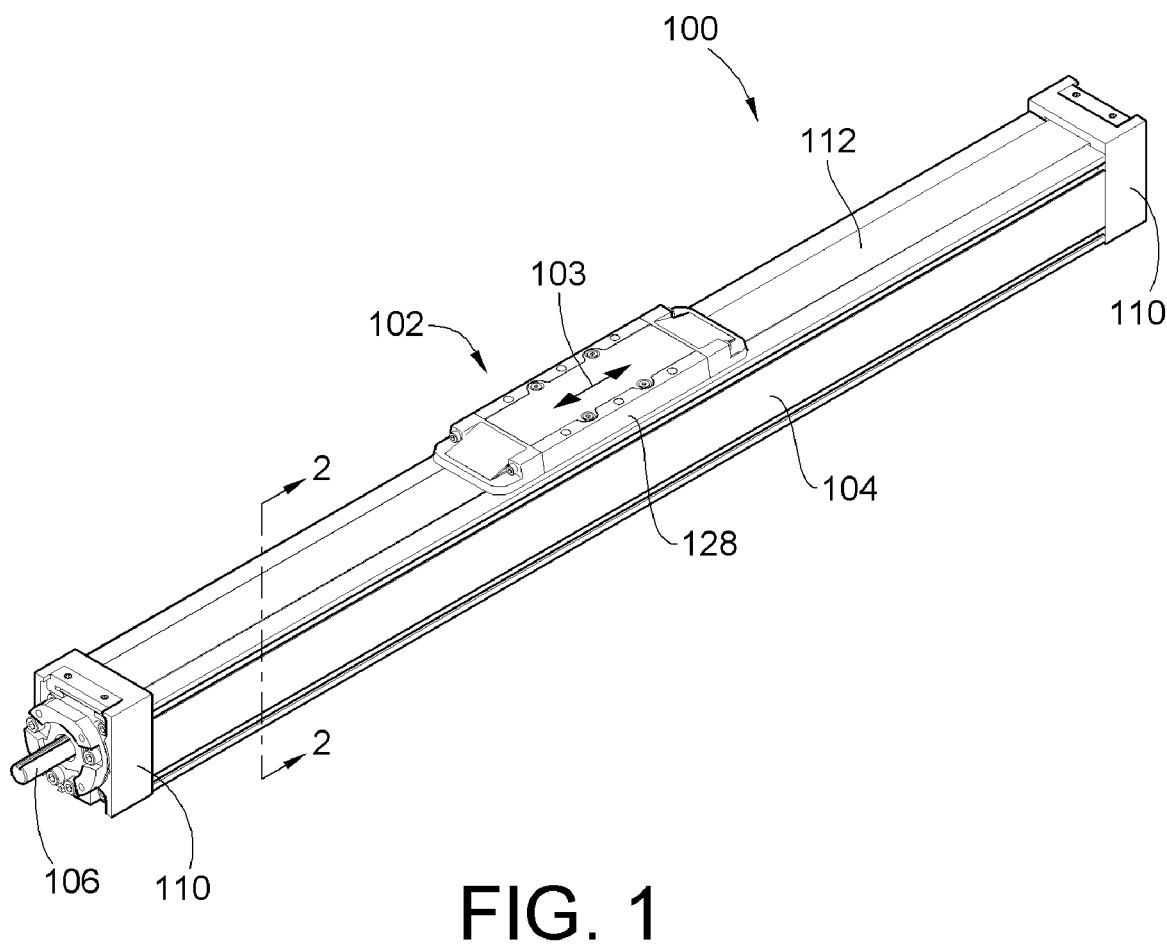
FIG. 1 is a perspective top view of an exemplary embodiment of a bearing assembly in the form of a linear bearing in accordance with the teachings of the present invention.

FIG. 1 is a perspective top illustration of a bearing assembly illustrated in the form of linear bearing 100 according to an embodiment of the present invention. The linear bearing 100 generally includes a carriage 102 and a support rail 104. The carriage 102 is linearly movable along the support rail 104 back and forth in the directions of the double arrow 103. Device such as tools or other objects may be mounted to the carriage 102 such that they may be linearly transported via the linear bearing 100.

The support rail 104 is an extruded generally U-shaped (FIG. 3) body forming an internal channel 105 therein. The linear bearing 100 can include an actuation assembly that may include a lead screw, ball screw, belt assembly or like device connected to the carriage 102 to drive the carriage 102 linearly along the support rail 104. In the illustrated embodiment, the linear bearing 100 includes a ball screw 106 and the carriage includes a cooperating ball screw nut 108 (see FIG. 4 or 5) for transferring loading therebetween to drive the carriage 102 linearly along the support rail 104.

Figure 2:
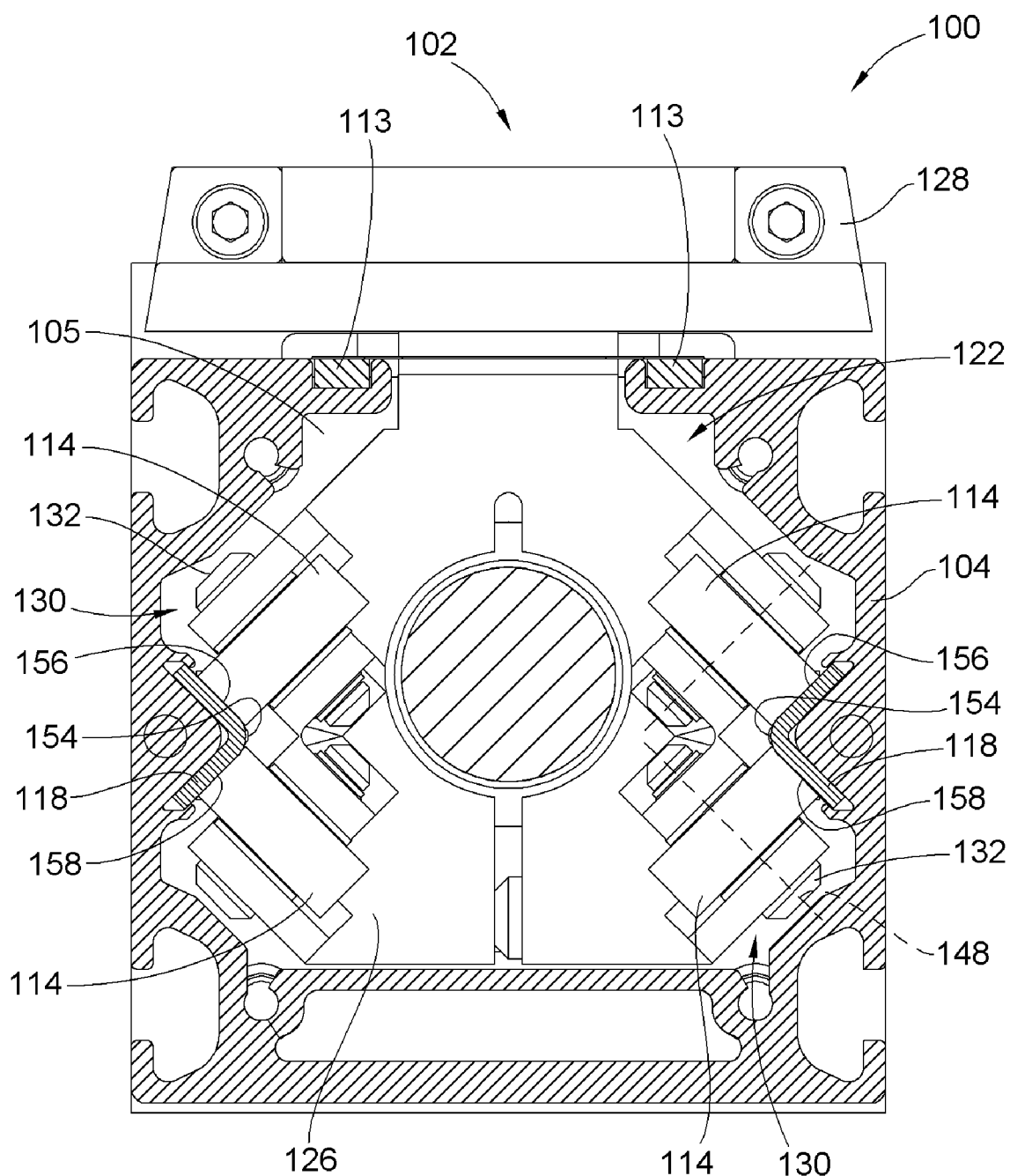
FIG. 2 is a cross-sectional illustration of the bearing assembly of FIG. 1 about line 2-2.

With reference to FIGS. 1 and 2, the linear bearing 100 includes two end caps 110 and a magnetic sealing strip 112 to enclose the channel 105 of the support rail 104. Two magnetic strips 113 mounted to the support rail 104 draw the magnetic sealing strip 112 toward the top of the support rail 104 to seal the opening in the top of the support rail 104 to prevent debris such as dust from entering the channel 105 and contaminating the interaction between the actuation assembly and the carriage 102 or the carriage 102 and the support rail 104.

Figure 4:
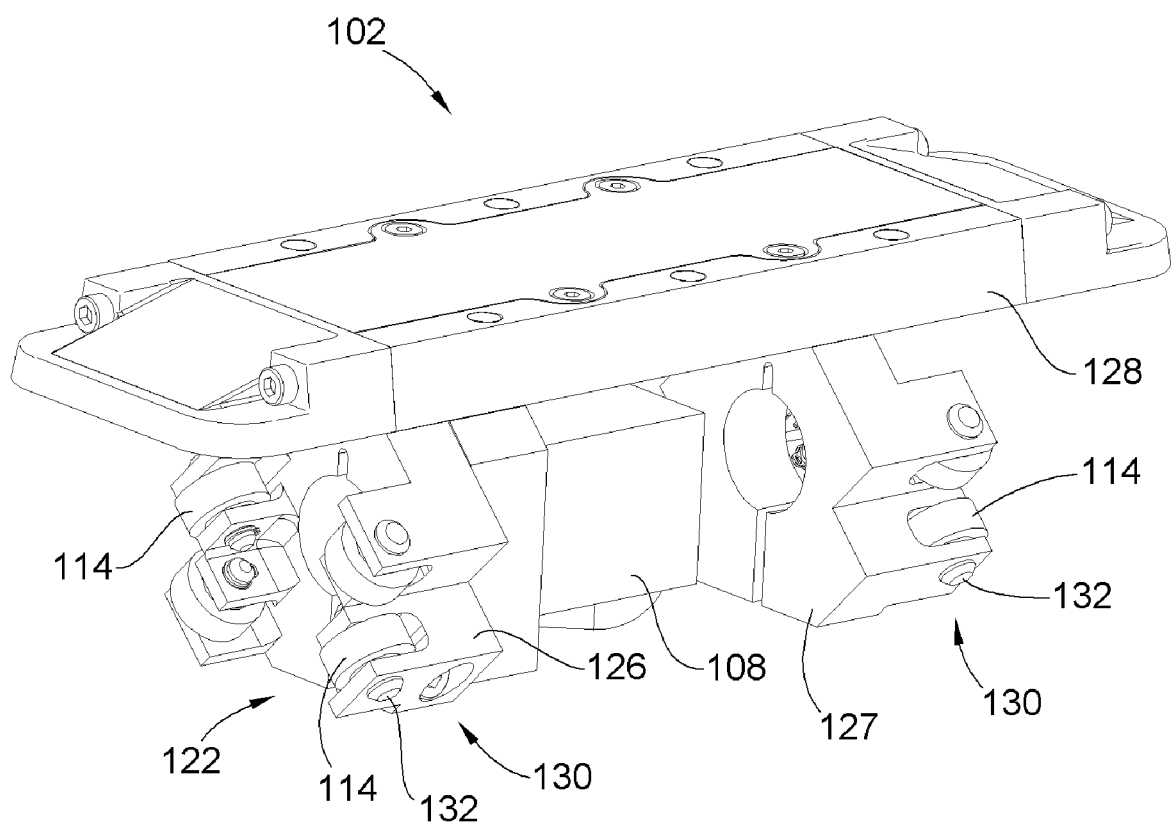
FIGS. 4 and 5 are perspective views of carriages for use with the support rail and bearing rail of FIG. 3.
Figure 6:
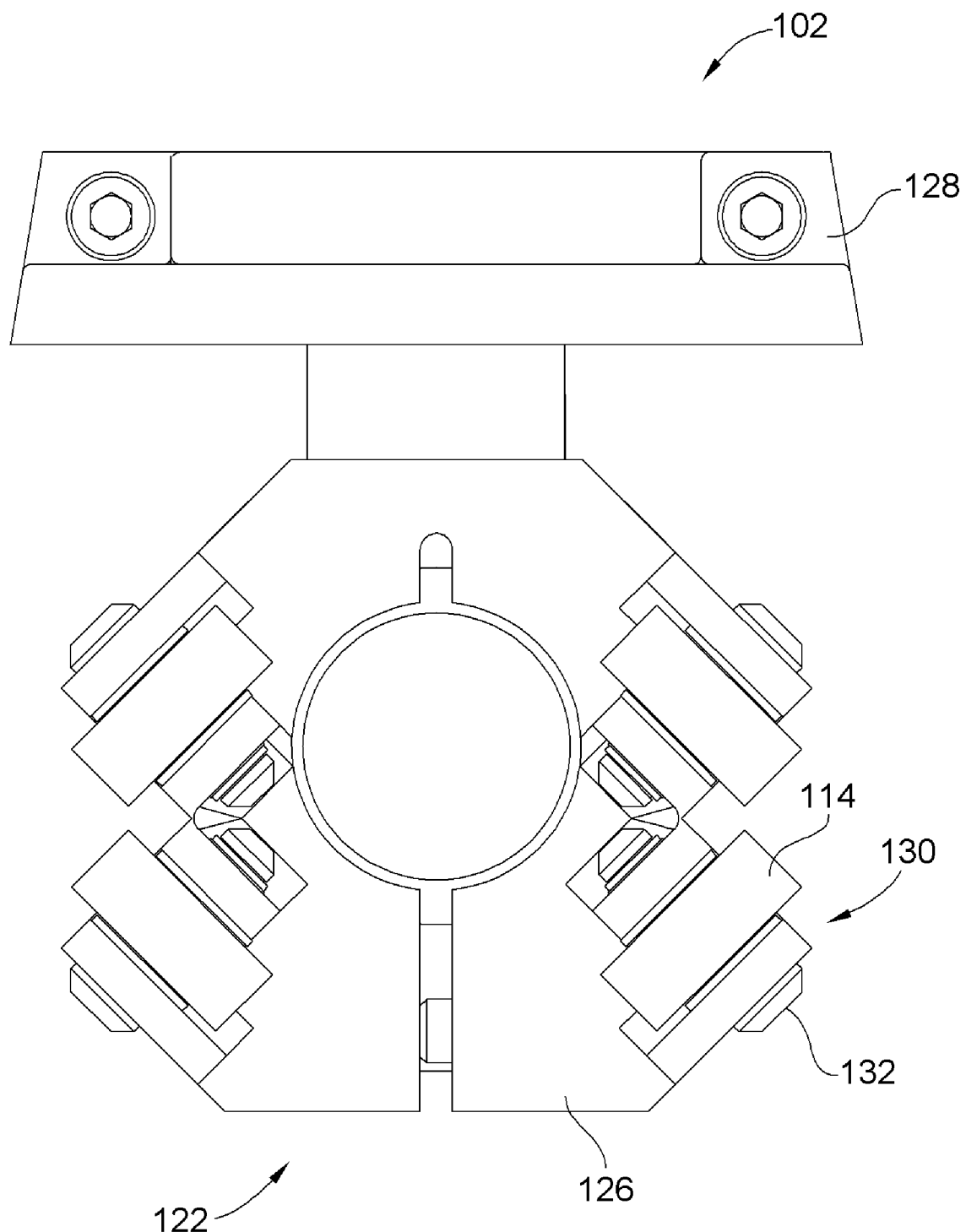
FIG. 6 is an end view of the carriage of FIG. 4.

As illustrated in the cross-sectional illustration of FIG. 2, one embodiment of the carriage 102 includes a body 122 that extends into the channel 105 of the support rail 104 through the opening in the top of the U-shaped support rail 104. With further reference to FIGS. 4 and 6, illustrating a representative carriage 102, the body 122 of the carriage 102 includes a pair of roller cradles 126, 127 that each mount four guide rollers 114. The guide rollers 114 are used to support the carriage 102 on guide rails 118 and permit the carriage 102 to move relative thereto. The body 122 further includes the ball screw nut 108, which is illustrated as being connected to roller cradle 126. The body 122 also includes a top plate 128 to which working devices (not shown) may be secured such that the devices may be linearly actuated by the linear bearing 100.

Figure 5:
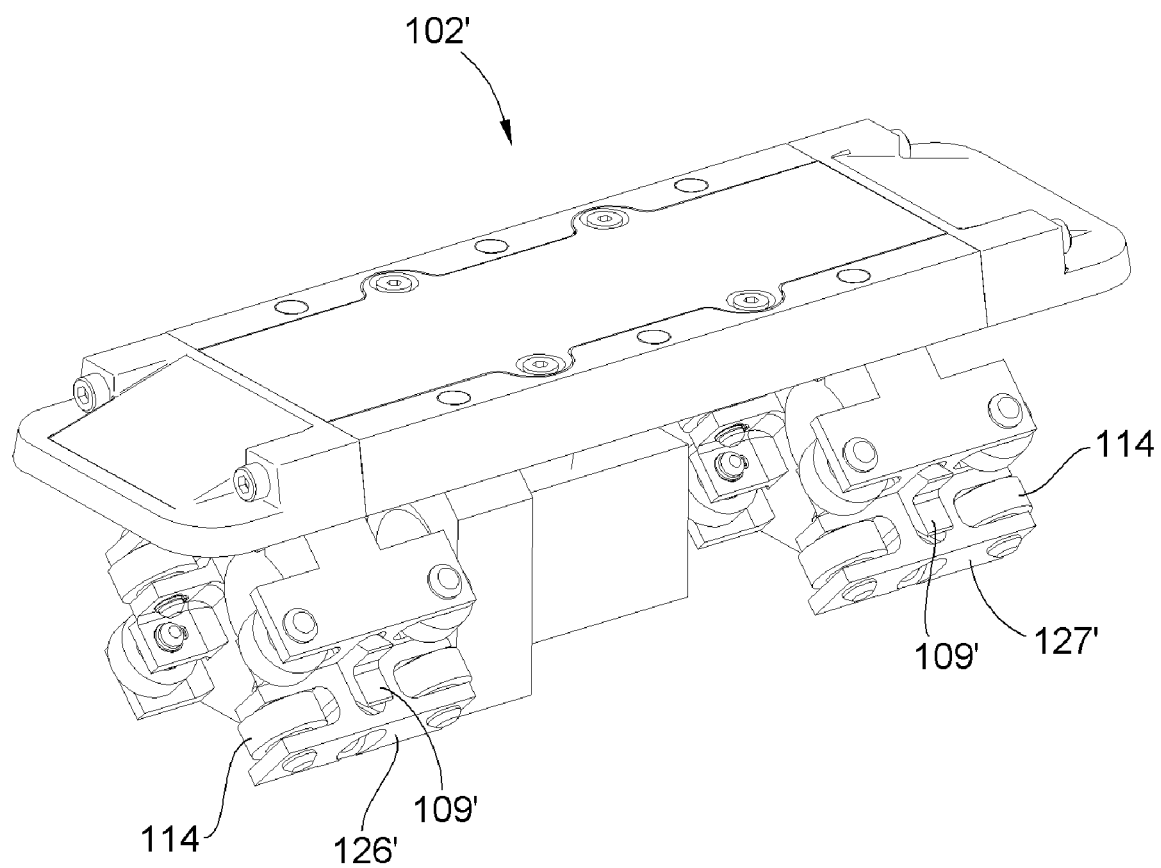

FIG. 5 illustrates a second representative carriage 102' that is substantially similar to the carriage 102 of FIG. 4. This carriage 102' includes roller cradles 126', 127' that each mount eight guide rollers 114. This carriage 102' also includes wipers 109' interposed between adjacent pairs of aligned rollers 114 of a given roller cradle 126', 127'. The wipers 109' are used to lubricate and clean the surface upon which the guide rollers 114 are supported and ride.

Due to accuracy and improved tolerance in methods of making the bearing assembly, including forming and assembling the support rail 104 and bearing rails 118, the guide rollers 114 mount to the body 122 of the carriage 102 in a fixed, non-adjustable position. More particularly, with reference to FIGS. 2 and 4, the illustrated guide rollers 114 are mounted using a yoke-and-pin arrangement where the roller cradles 126, 127 include a plurality of yokes 130 that each support an individual pin 132 that functions as an axel on which the guide rollers 114 rotate. The position of the rollers relative to the body 122 can not be altered. As the guide rollers 114 have a fixed position relative to the body 122, the axes, illustrated as dashed lines 148, about which the guide rollers 114 rotate cannot be altered such that the guide rollers 114 can be moved closer to or farther from the bearing rails 118. However, it is contemplated that other mounting arrangements can be utilized.

Figure 3:
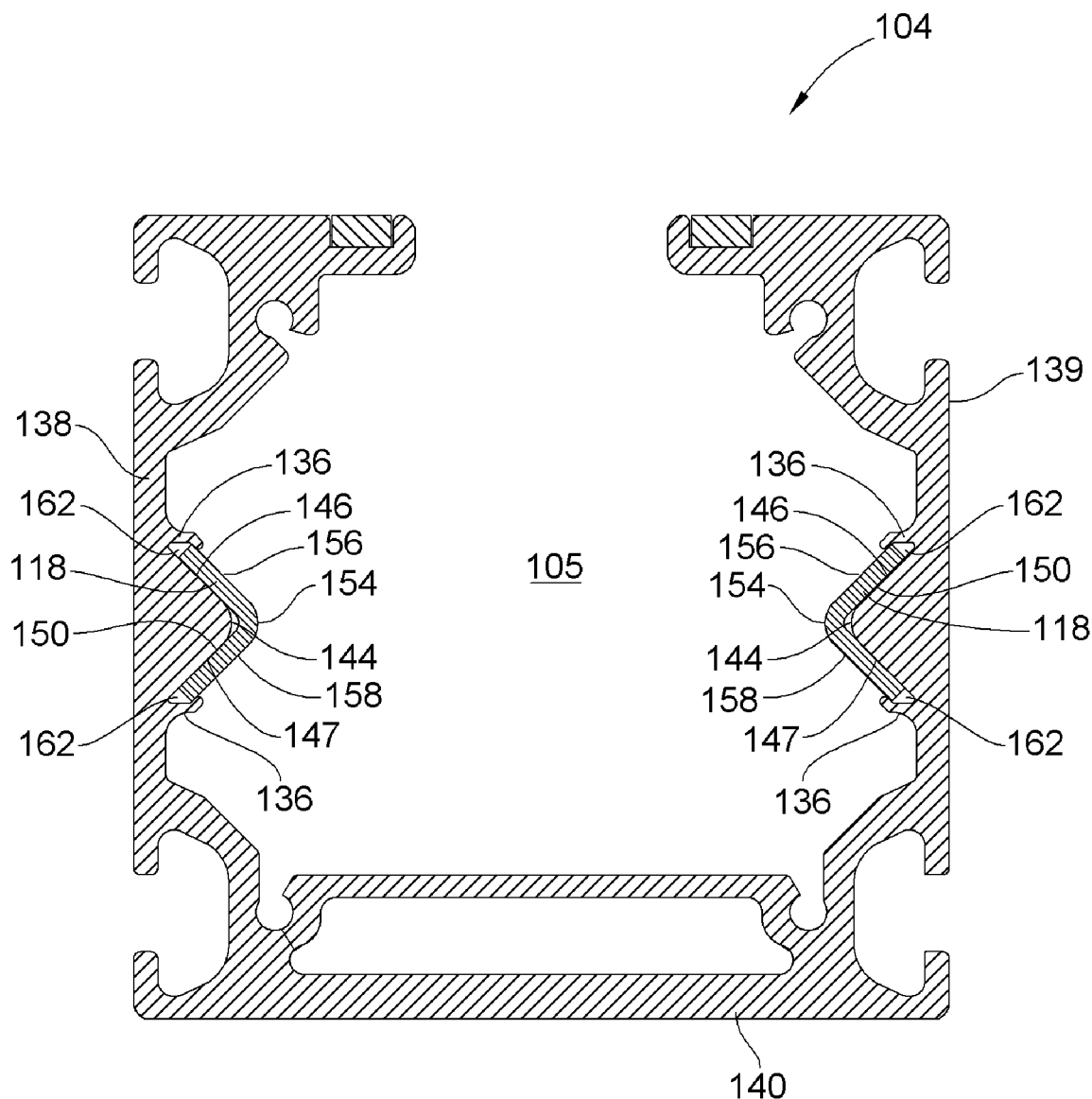
FIG. 3 is a cross-sectional illustration of the support rail and bearing rail of FIG. 2 with the carriage of the bearing assembly removed.

With reference to FIG. 3, the U-shaped support rail 104 includes two profiled upstanding side walls 138, 139 that are connected by a profiled bottom wall 140. The walls 138-140 combine to define channel 105. The support rail 104 includes a plurality of swaging tabs 136 that extend inward from the upstanding sidewalls 138, 139 that secure the bearing rails 118 to the support rail 104. The swaging tabs 136 can be continuous along the entire length of the support rail 104 or segmented tabs. Preferably, the swaging tabs 136 are continuous and are unitarily formed with the side walls 138, 139 during extrusion of the support rail 104. Alternatively, the swaging tabs 136 can be machined into the side walls 138, 139 of the support rail 104 after initial formation of the support rail 104. Typically, the support rail 104 is formed of extruded aluminum.

The support rail 104, particularly side walls 138, 139 of the support rail 104, includes substantially V-shaped mounting surfaces, identified generally with reference numeral 144, including top mounting surface portions 146 and bottom mounting surface portions 147. The mounting surfaces 144 are interposed between adjacent ones of the swaging tabs 136. In the present embodiment, the mounting surface portions 146, 147 of mounting surface 144 of side wall 138, converge in a direction extending towards the opposed side wall 139. Similarly, the mounting surface portions 146, 147 of a the mounting surface 144 of side wall 139 converge in a direction extending towards the opposed side wall 138. In a preferred embodiment, the mounting surfaces 144 are initial formed during extrusion of the support rail 104. However, the mounting surfaces 144 could be formed by subsequent machining of the support rail 104.

To increase the wearability and strength of the support rail 104, the bearing rails 118 provide a hard surface on which the guide rollers 114 ride as the carriage 102 travels along the length of the linear bearing 100. The bearing rails 118 include a pair of opposed legs that extend at an angle relative to each other to provide a V-shaped profile or cross-section that is closely sized to the V-shaped mounting surfaces 144. The outer surface of each bearing rail 118 provides a bearing surface, indicated generally at reference numeral 154, which includes upper and lower bearing surfaces 156, 158, upon which the guide rollers 114 ride (see FIG. 2). As such, a given V-shaped bearing rail 118 includes two bearing surfaces 156, 158 that face away from one another, albeit at an angle.

The swaging tabs 136 secure the bearing rails 118 to the mounting surfaces 144. More particularly, the legs of the bearing rails 118 are received and secured in cavities 162 formed between the swaging tabs 136 and the mounting surfaces 144.

Figure 9:
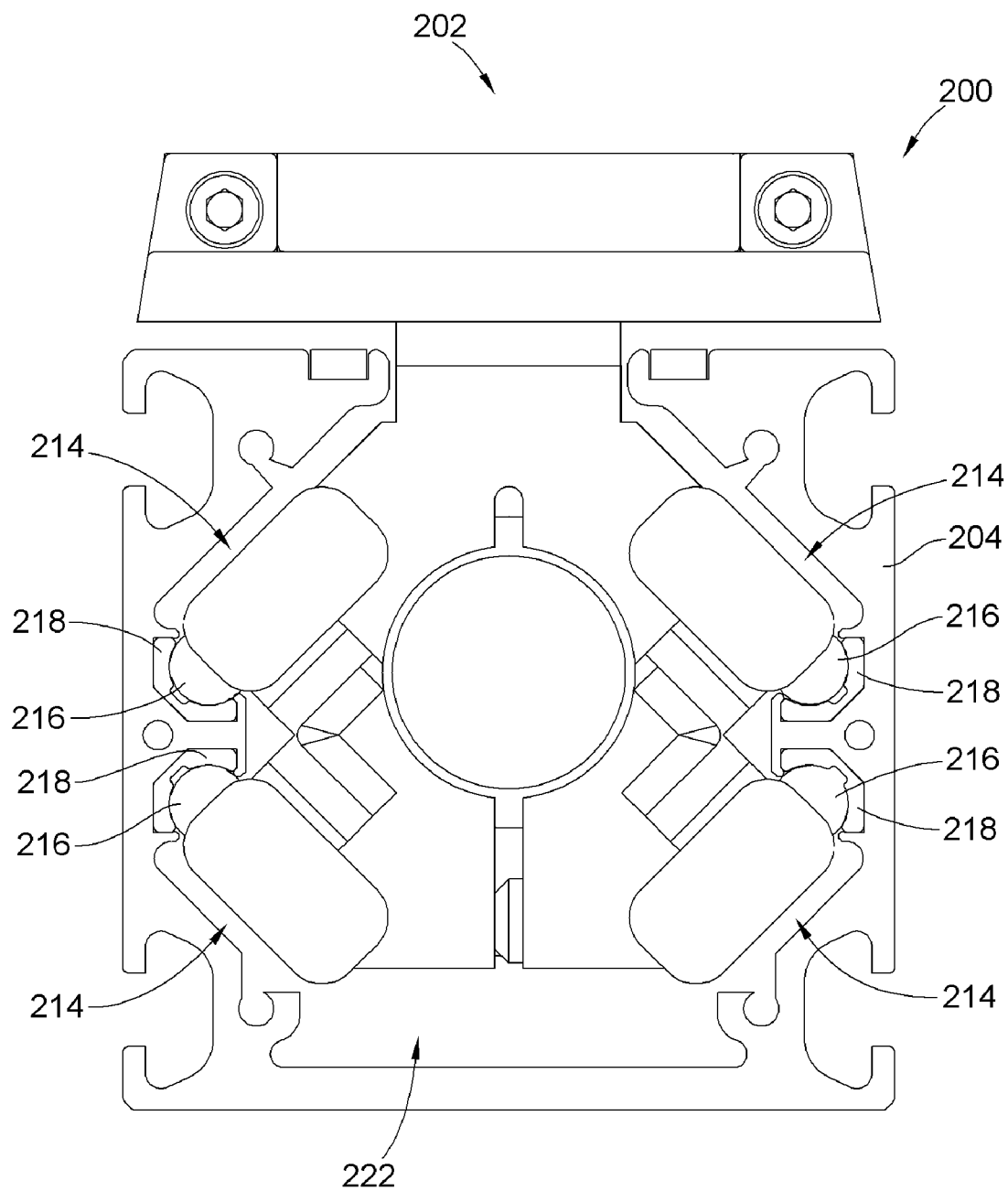
FIG. 9 is a cross-sectional illustration of an alternative embodiment of a bearing assembly according to the teachings of the present invention.
Figure 10:
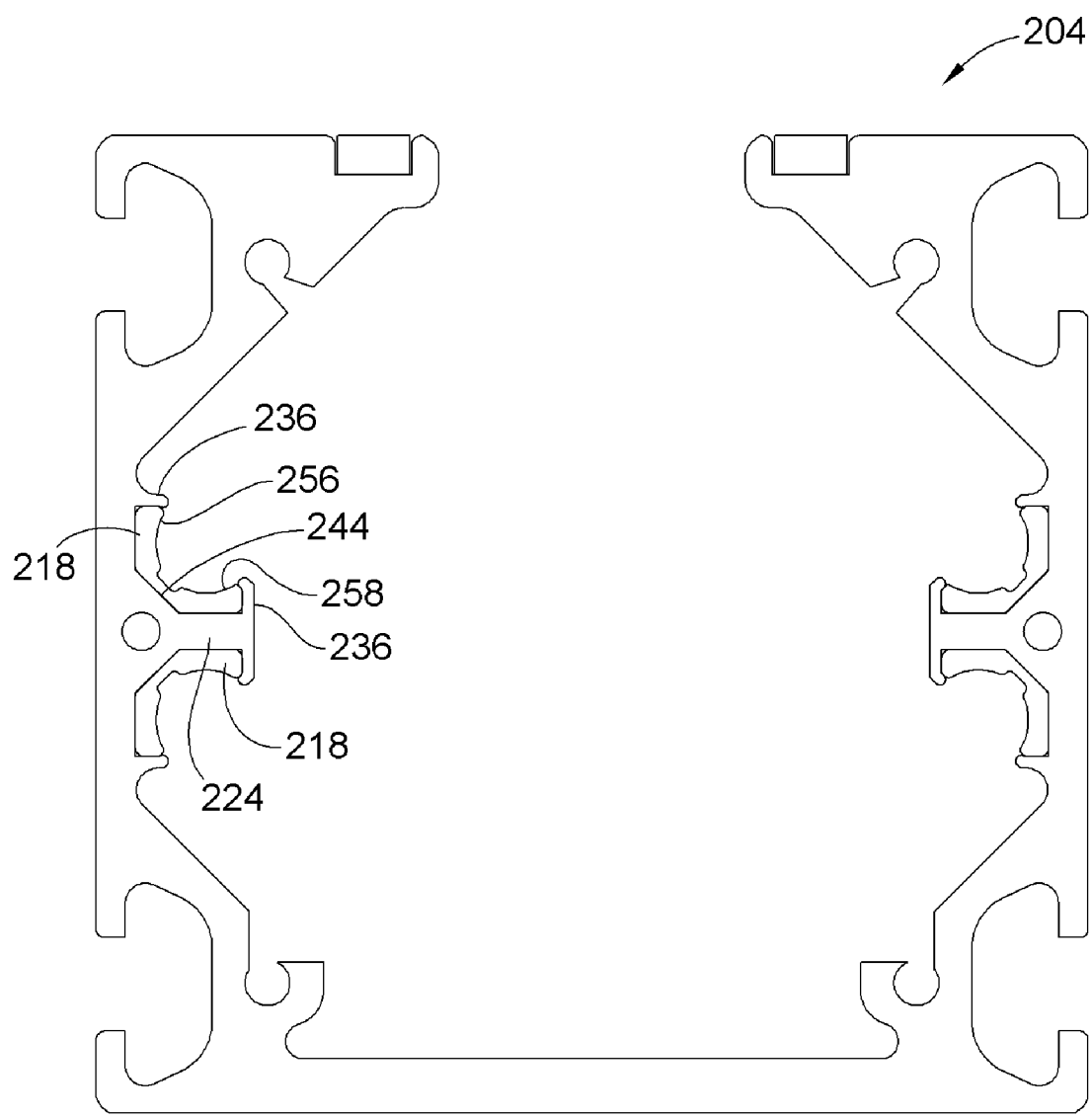
FIG. 10 is an end view of the support rail and bearing rails of the bearing assembly of FIG. 9.

An alternative embodiment of a linear bearing 200 is illustrated with reference to FIGS. 9, 10 and 13. This embodiment utilizes a carriage 202 that includes a plurality of recirculating ball bearing assemblies 214 to support the carriage on support rail 204 rather than a plurality of guide rollers. The recirculating ball bearing assemblies 214 include a plurality of ball bearings 216 that circulate therethrough as the carriage 202 moves linearly along the support rail 202. Preferably, the recirculating ball bearing assemblies 214 are fixed to the body 222 of the carriage 202 in a fixed, non-adjustable position.

In this embodiment, the support rail 204 includes four bearing rails 218 that are mounted to the support rail by swaging tabs 236. The mounting surface 244 of the present embodiment includes three mounting surface segments. Adjacent bearing rails 218 are separated from one another by a T-shaped separating wall 224 that includes a pair of swaging tabs 236 for securing the bearing rails 218.

Each bearing rail 218 of this embodiment includes two arched bearing surfaces 256, 258 that face toward one another. Preferably, the bearing surfaces 256, 258 combine to form a gothic arch profile, as illustrated. As such, the radii R1, R2 of bearing surface 256, 258, respectively, are equal. However, the bearing surfaces 256, 258 are positioned relative to one another such that the radius lines of each bearing surface 256, 258 intersect at a position, illustrated as reference numeral 234, that is offset from the ends of the radius lines in a direction toward the bearing surfaces 256, 258, as illustrated in FIG. 13.

In this configuration, a ball bearing having a slightly smaller radius than the radii of the two bearing surfaces 256, 258 can ride along the length of the guide rails 218 in contact with both bearing surfaces 256, 258 substantially at a single contact point 242, 243, as is well known in the art. The contact points 242, 243 are linear bearing contacts that extend along the length of the bearing rails 218. Depending on the size of the ball bearings 216 used, the location of the contact points 242, 243 along the profile of the bearing surfaces 256, 258 can vary.

Figure 11:
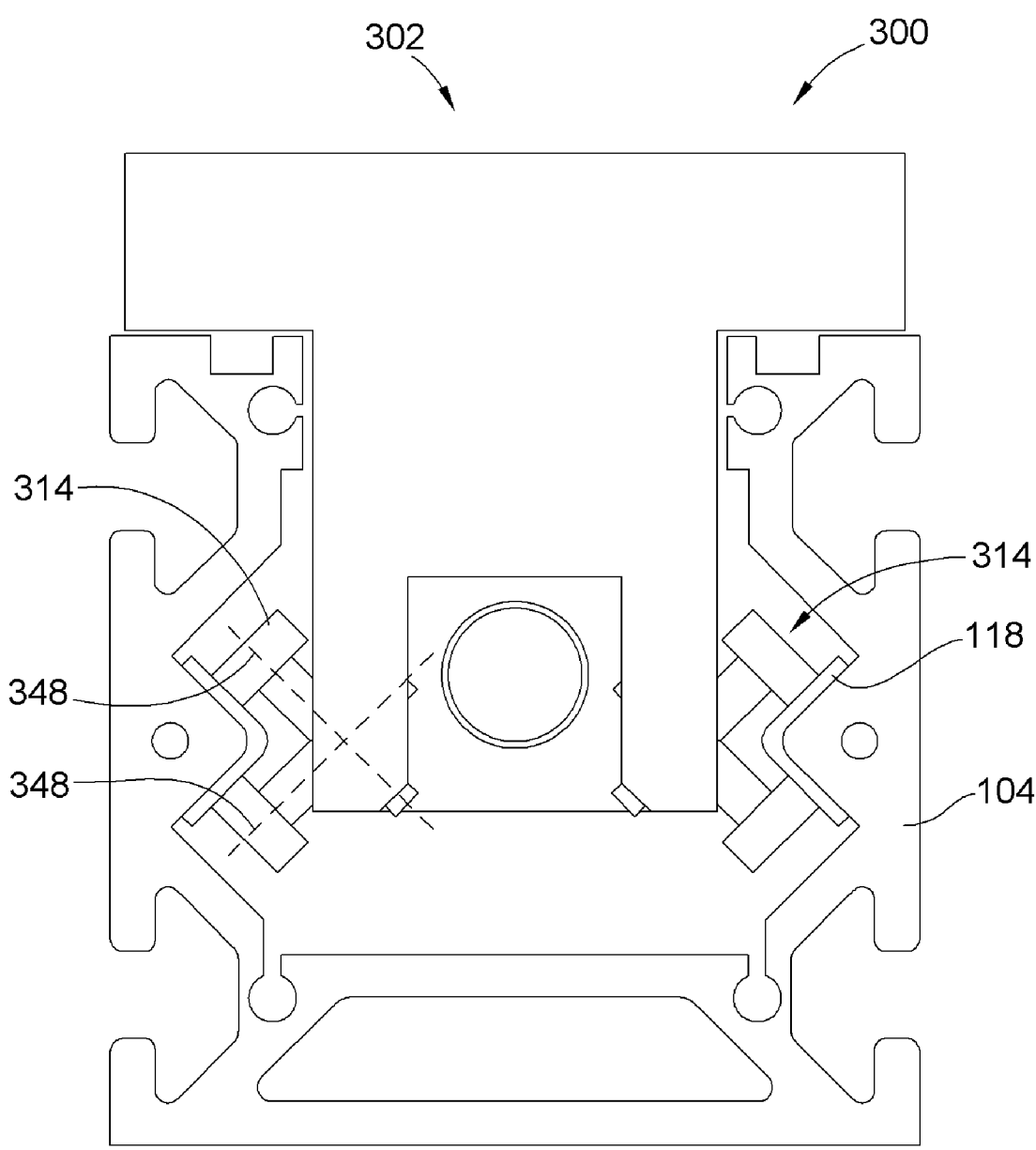
FIG. 11 is an end view of an alternative embodiment of a bearing assembly according to the teachings of the present invention.

A further alternative embodiment of a linear bearing 300 is illustrated in FIG. 11. In this embodiment, the support rail 104 and bearing rails 118 is substantially similar to that of FIG. 3. However, in this embodiment, the carriage 302 includes fixed position cam followers 314 that fixed axes of rotation 348. These cam followers 314 are similar to the rollers 114 of the previous embodiment, however, they use a stub shaft rather than a yoke-and-pin mounting arrangement. Further, the individual cam followers 314 that ride on an individual bearing rail 118 may be axially offset from one another.

Methods of making the linear bearing assemblies according to the present invention will now be described. The methods will primarily be described with reference to the embodiment illustrated in FIGS. 1-3, 7-8, and 12 while focusing on the assembly and manufacture of the support rail 104 and bearing rails 118. However, the methods are generally applicable to the other embodiments. Differences between the embodiments will be described.

To form the support rail 104, the support rail 104 is preferably extruded from aluminum to form sidewalls 138, 139 and bottom wall 140 forming channel 105. In a preferred method, the swaging tabs 136 and mounting surfaces 144 will be initially provided as the support rail 104 is extruded. Alternatively, the swaging tabs 136 and mounting surfaces 144 may be formed by subsequent machining away of the material of the support rail 104.

Figure 7:
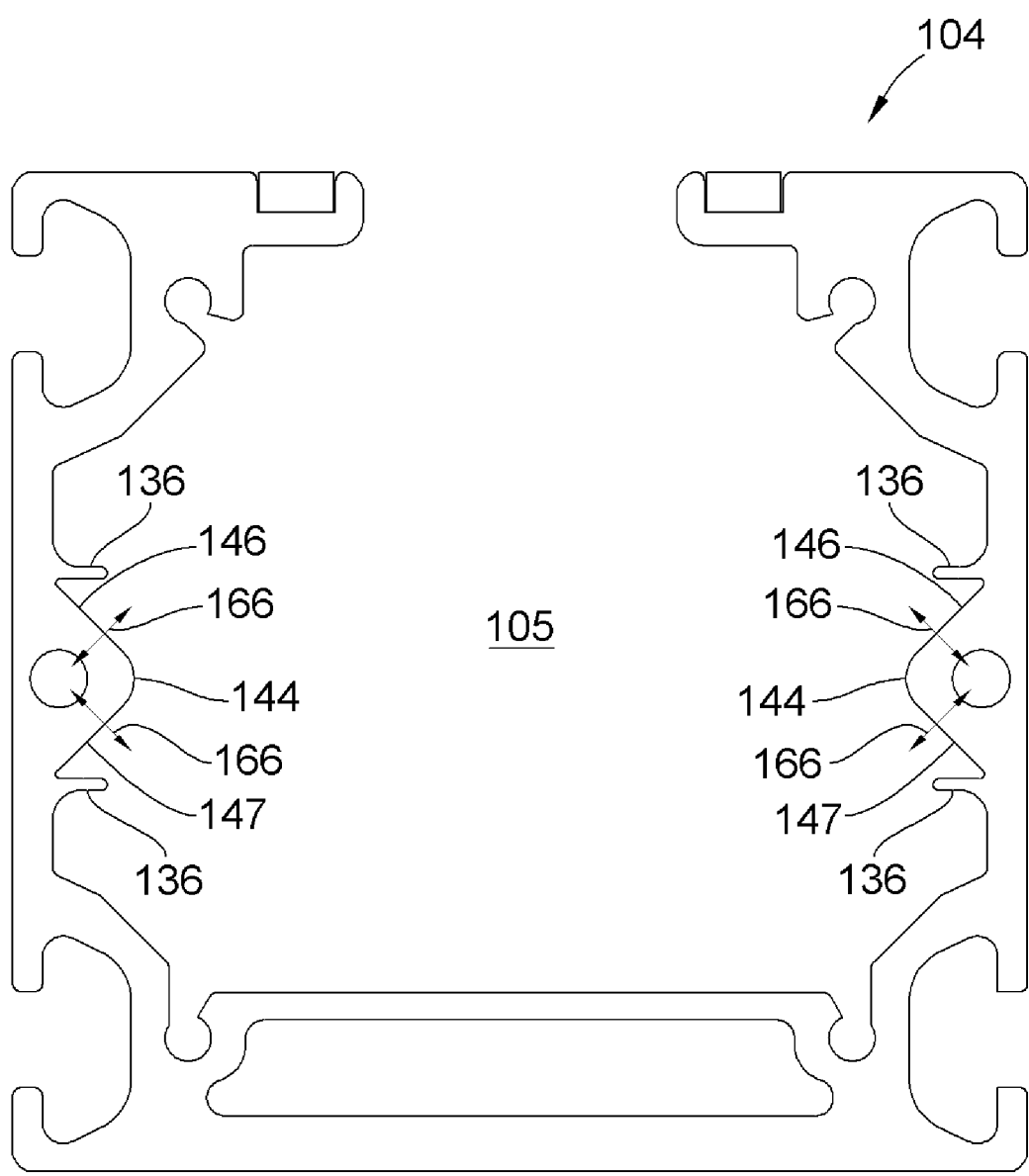
FIG. 7 is an end view of the support rail of FIG. 1 prior to the bearing rail being mounted to the support rail.

Preferably, when the mounting surfaces are extruded, the mounting surfaces 144 are then subsequently machined to provide improved precision to provide a tolerance variance from true linear straight of less than 0.002 inches when measured over a 12 inches linear span (even though it need extend the full 12 inches). In the raw extruded shape, the tolerance variance can be about 0.012 inches over 12 inches, such that significant straightness improvement may achieved with this machining operation. If the mounting surfaces 146, 147 are maintained truly parallel, the separation tolerance variance between the mounting surfaces 146, 147 can be about double between of less than about 0.004 inches. A "tolerance variance from true linear straight" can be understood as the allowable variation of the mounting surfaces 146, 147 from a perfectly planar surface when viewed in cross, as illustrated in FIG. 7. This tolerance variance need only apply to the portion against which a subsequently mounted bearing rail abuts. True linear straight will not have any variation in either direction along double arrows 166 that would make the mounting surface wavy or uneven. As such, the tolerance variance defines the amount of variation in the mounting surfaces 146, 147 along a given length of the mounting surfaces 146, 147. It will be appreciated that different extrusion and surface longitudinal lengths can be accomplished both longer and shorter than 12 inches. Thus, no limitation on length is intended (e.g. the claims that include numerical limitations are meant to literally include sections of longer and shorter sections), rather it is merely a standardized length over which variance and tolerances in straightness can be measured.

Figure 8:
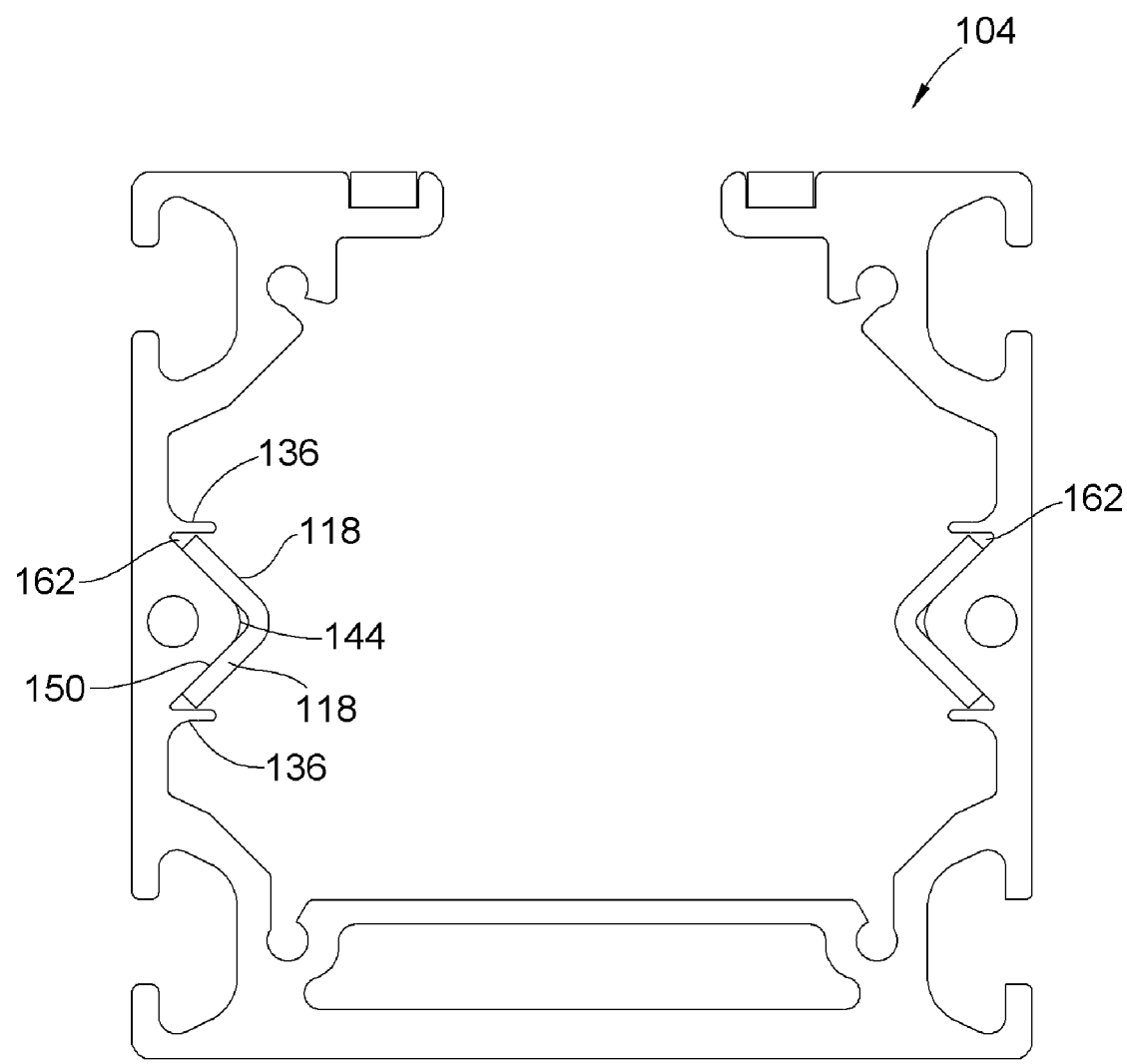
FIG. 8 is an end view of the support rail of FIG. 1 with the bearing rail positioned adjacent the support rail prior to being secured to the support rail.

After the mounting surfaces 144 are provided, the bearing rails 118 may be mounted to the mounting surfaces 144. More particularly, inner surfaces 150 of the bearing rails 150 abuts against the mounting surfaces 144 with the legs of the bearing rails 118 inserted into cavities 162, as illustrated in FIG. 8.

The bearing rails 118 are secured to the mounting surfaces by swaging the swaging tabs 136 into engagement with the ends of the bearing rails 118, which plastically deforms the swaging tabs 136. Preferably, swaging is performed by a rolling method where a roller causes the swaging tabs 136 to deform over the ends of the bearing rails 118. Preferably, the swaging tabs 136 are initially straight (FIG. 8) and then plastically deformed over the ends of the bearing rails 118 to secure the bearing rails 118 (FIG. 3). However, alternatively the swaging tabs 136 may be angled outward relative to one another to make it easier to insert the bearing rails 118 between the swaging tabs 136.

Preferably, methods include initially forming a bearing rail 118 in the V-shape by roll forming. The roll forming bends the bearing rail 118 to form the adjacent legs to provide the V-shaped cross-section. The roll forming provides the bearing rail 118 with a first linear characteristic, i.e. a first tolerance variance from true linear straight. Each bearing rail 118 is initially roll formed such that each bearing surface 156, 158 is provided with a tolerance variance from true linear straight that is anticipated to be significantly greater than a machined and preferably polished tolerance variance.

Figure 12:
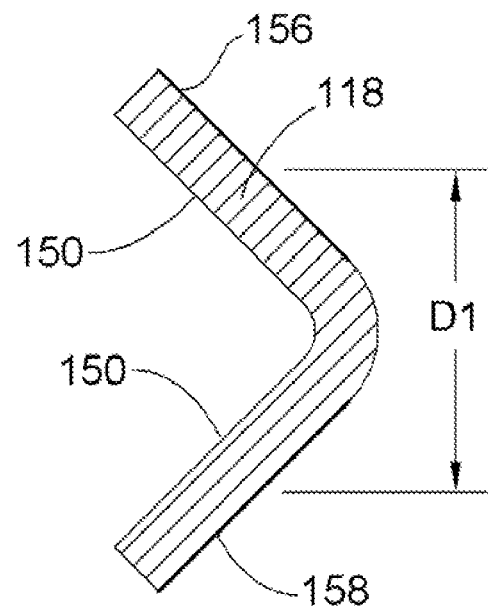
FIGS. 12 and 13 are cross-sectional illustrations of representative bearing rails according to the teachings of the present invention.

The bearing rails 118 can then be precision machined to provide bearing surfaces 156, 158 with a second linear characteristic. This second linear characteristic is a second tolerance variance from true linear straight that is more precise than the first linear characteristic provided by the roll forming. Preferably, each bearing surface 156, 158 is machined and preferably superpolished to provide a tolerance variance from true linear straight of less than 0.001 inches when measured over a 12 inch linear span. Assuming perfectly parallel relation, the tolerance variance between the bearing surface 156, 158 from true straight may be about double and less than about 0.002 inches. In FIG. 12, the machined portion of the bearing surfaces 156, 158 is illustrated by the jagged lines illustrating that the machined portion of the bearing surfaces 146, 158 need not extend along the entire outer surface of the bearing rail 118.

Figure 13:
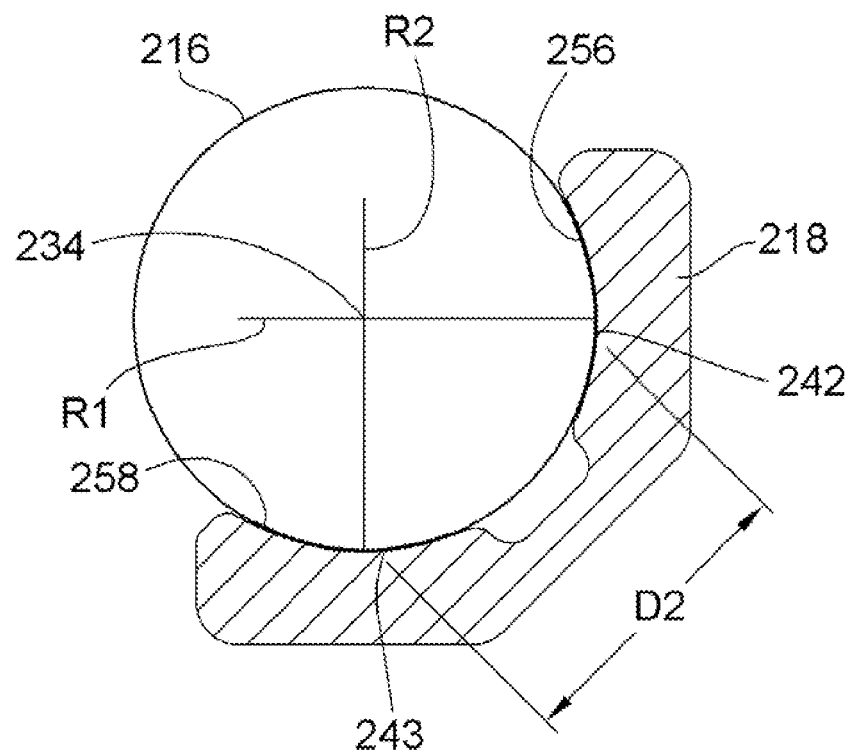

With respect to the bearing rail 218 of FIG. 13, the linear bearing contacts defined by the contact points 242, 243 along the length of the bearing rails 218 preferably have this same tolerance variance. True linear straight with regard to this embodiment refers to a linear bearing contact that would form a perfectly straight line along the length of the bearing rail 218.

The machining of the bearing surfaces 156, 158 may be performed by grinding and typically by precision polishing.

Further, the bearing rails 118 are preferably machined such that each of the upper and lower bearing surfaces 156, 158 include a linear bearing contact. With reference to FIG. 2, the linear bearing contact is the location where a supported guide roller 114, or similar supporting device, contacts the bearing surface 154 of the bearing rails 118. With reference to FIG. 12, the V-shaped bearing rail 118 has bearing surfaces 156, 158 that include the machined linear bearing contacts that face outward and away from one another. Preferably, the upper and lower bearing surfaces 156, 158 of bearing rail 118 are machined such that given aligned points or lines of the linear bearing contacts that are equally spaced from the bend point of the bearing rail 118 of to have a spaced apart distance, illustrated as distance D1, that has a tolerance variance of less than 0.002 inches when measured over a linear span of between 12 inches of a rail section (this is double the linear variance of a single point/line).

With brief reference to FIG. 13, the distance D2 between linear contact points/lines 242, 243 also preferably has this same tolerance variance.

The maximum permitted tolerance variances of an individual surface 156, 158 or the distance between the surfaces 156, 158 prevents the upper and lower bearing surfaces 156, 158 from becoming too spaced apart from one another such that the guide rollers bind with the bearing surfaces 156, 158. These tolerances also prevent the bearing surfaces 156, 158 from becoming too close to one another such that slop is provided between the bearing surfaces 156, 158 and corresponding guide rollers 114. By providing tightly toleranced bearing surfaces, and corresponding linear bearing contacts, fixed position guide rollers 114 of carriage 104 can be used. In other words, the spacing and positioning of the guide rollers 114 need not be adjustable to allow adjustment of the guide rollers 114 to provide the proper engagement between the guide rollers and the bearing rails because the bearing surfaces 156, 158 and bearing rails 118 are free of the warpage and variations that may be provided by merely roll forming or extruding the bearing rails 118.

In a preferred method, the machining, i.e. polishing, of the bearing surfaces 156, 158 is performed after the bearing rails 118 are mounted to the support rail 104. However, in other embodiments, the bearing rails 118 are machined prior to mounting to the support rail 104.

Methods of making the bearing assembly may also include the step of hardening the metal of the bearing rail 118.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of making a bearing assembly, comprising:
   extruding an aluminum support rail having unitarily formed swaging tabs;
   providing a mounting surface on the support rail;
   mounting a bearing rail on the mounting surface;
   machining a bearing surface on the bearing rail;
   wherein the step of machining is subsequent to the step of mounting;
   said mounting including installing the bearing rail on the mounting surface and swaging the swaging tabs into engagement with the bearing rail; and
   wherein the step of swaging includes swaging the swaging tabs on top of and into engagement with the bearing surface of the bearing rail such that a first portion of the bearing surface is exposed between the swaging tabs and is configured for rolling contact with a guide roller, and a second portion of the bearing surface is masked by the swaging tabs.

2. The method of claim 1, wherein said machining the bearing surface includes polishing the bearing surface to include a linear bearing contact having a tolerance variance from true linear straight of less than about 0.001 inches when measured over a linear span of 12 inches of a rail section.

3. The method of claim 2, wherein roll forming the bearing rail includes forming the bearing rail into a V-shape formed by first and second converging legs, the bearing surface providing first and second linear bearing contacts facing away from one another with one linear bearing contact formed on each leg.

4. The method of claim 3, wherein machining the bearing surface includes polishing the first and second linear bearing contacts such that aligned points of the first and second linear bearing contacts are spaced apart a distance having a tolerance variance of less than about 0.002 inches when measured over a linear span of 12 inches of a rail section.

5. The method of claim 4, further including providing a carriage assembly having a body and a plurality of rollers non-adjustably mounted to the body, at least one roller engaging a first one of the bearing contacts and at least another one of the rollers engaging a second one of the bearing contacts.

6. The method of claim 1, wherein the bearing rail comprises steel.

7. The method of claim 6, further comprising roll forming the bearing rail to a first linear characteristic, and the machining of the bearing surface providing a second linear characteristic more precise than said first linear characteristic.

8. The method of claim 7, wherein the second linear characteristic is sufficiently precise to provide for fixed position bearing engagement with the bearing surface as opposed to requiring adjustable bearing engagement.

9. The method of claim 7, further comprising hardening the steel of the bearing rail prior to said machining.

10. The method of claim 1, wherein providing the mounting surface includes machining away material of the support rail to provide a machined mounting surface.

* * * * *